INVENTORS
JAMES C. MILLER &
CHARLES M. WINE
BY Samuel Cohen
Attorney

READ-ONLY MEMORIES

INVENTORS
JAMES C. MILLER &
CHARLES M. WINE
BY Samuel Cohen
Attorney

READ-ONLY MEMORIES

Filed Nov. 26, 1965 5 Sheets-Sheet 3

INVENTORS
JAMES C. MILLER &
CHARLES M. WINE
BY [signature]
Attorney

Sept. 9, 1969 J. C. MILLER ET AL 3,466,625

READ-ONLY MEMORIES

Filed Nov. 26, 1965 5 Sheets-Sheet 4

Inventors:
JAMES C. MILLER &
CHARLES M. WINE
BY Samuel Cohen
Attorney

Inventors:
JAMES C. MILLER &
CHARLES M. WINE

BY [signature]
Attorney

United States Patent Office 3,466,625
Patented Sept. 9, 1969

3,466,625

READ-ONLY MEMORIES

James C. Miller, Pennington, and Charles M. Wine, Princeton, N.J., assignors to RCA Corporation, a corporation of Delaware Filed Nov. 26, 1965, Ser. No. 510,002
Int. Cl. G11c *11/08, 17/00*
U.S. Cl. 340—174 13 Claims

ABSTRACT OF THE DISCLOSURE

A sheet of insulator material formed with clusters of holes therein, lies on a sheet of magnetic material. Each cluster of holes defines a memory location and there are drive and sense conductors on the sheet of insulator material which pass among the clusters of holes. A second sheet of insulator material lies over the first sheet of insulator material and it has locations corresponding to the memory locations on the first sheet. However, the number of holes (there may be one or more) at each location on the second sheet is fewer than the number of holes in a cluster on the first sheet. The hole or holes at each location on the second sheet align with one or another group of holes, fewer than all, of the cluster of holes at the corresponding location in the first sheet. The last layer of the memory is of magnetic material and passes through the aligned holes in the second sheets and makes contact with the first layer of magnetic material.

This invention relates to new and improved "read-only" memories. A read-only memory is one which, after its initial fabrication, can not readily accept new information, particularly at electronic speeds. The stored information is generally permanently stored and may be read out non-destructively.

An object of this invention is to provide a read-only memory which is relatively simple and inexpensive.

Another object of this invention is to provide a read-only memory which is easily fabricated.

The memory of the invention includes a sheet of magnetic material. A sheet of insulator material formed with apertures therein and formed also with insulated drive and sense conductors thereon lies on the sheet of magnetic material. A second sheet of insulator material formed also with apertures therein aligned with some of the apertures in the first sheet of insulator material lies on the first sheet of insulator material. Each cluster of apertures in the first insulator sheet defines a memory location, the actual positions of the apertures in the second insulator sheet indicating whether that location represents storage of the binary digit (bit) 0 or 1. The fourth layer of the memory consists of a sheet of magnetic material which is applied in the form of a slurry so that it passes through the aligned holes in the two sheets of insulator material and makes contact with the first sheet of magnetic material. In a preferred form of the invention, the slurry is formed of a material which hardens when it dries.

The invention is discussed in greater detail below and is shown in the following drawings of which:

FIGURES 1*a*–1*d* are drawings of the four layers making up one embodiment of a memory according to the invention;

Figure 1A:
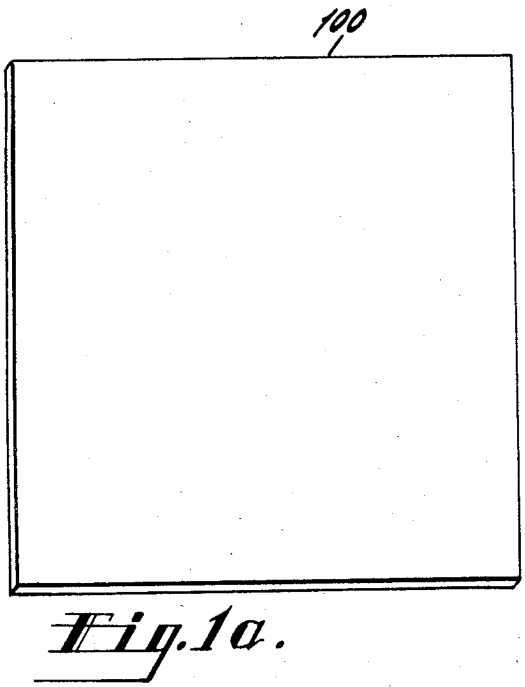
Figure 1B:
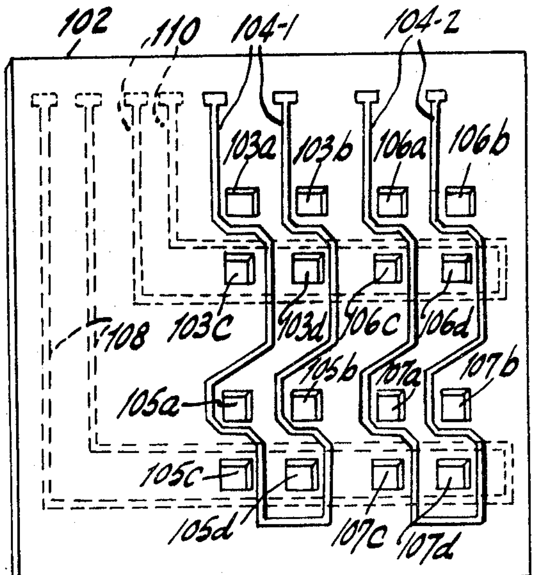
Figure 1C:
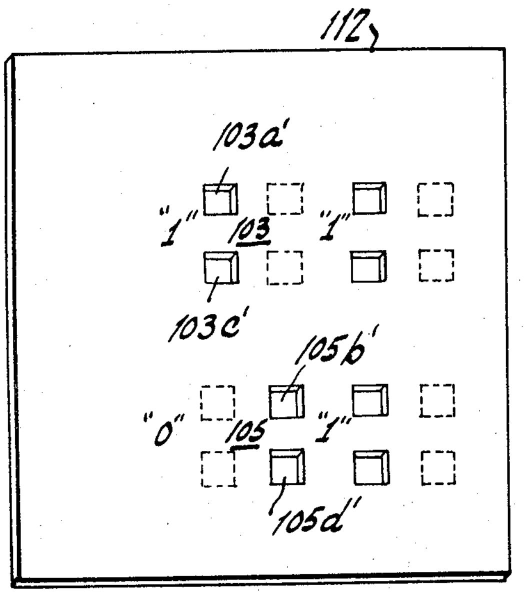
Figure 1D:
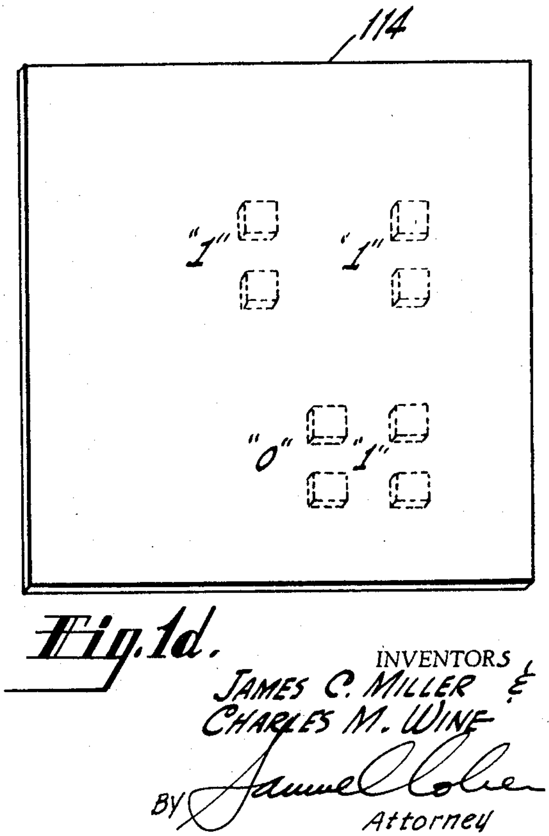
Figures 2, 3, 4A, 4B:
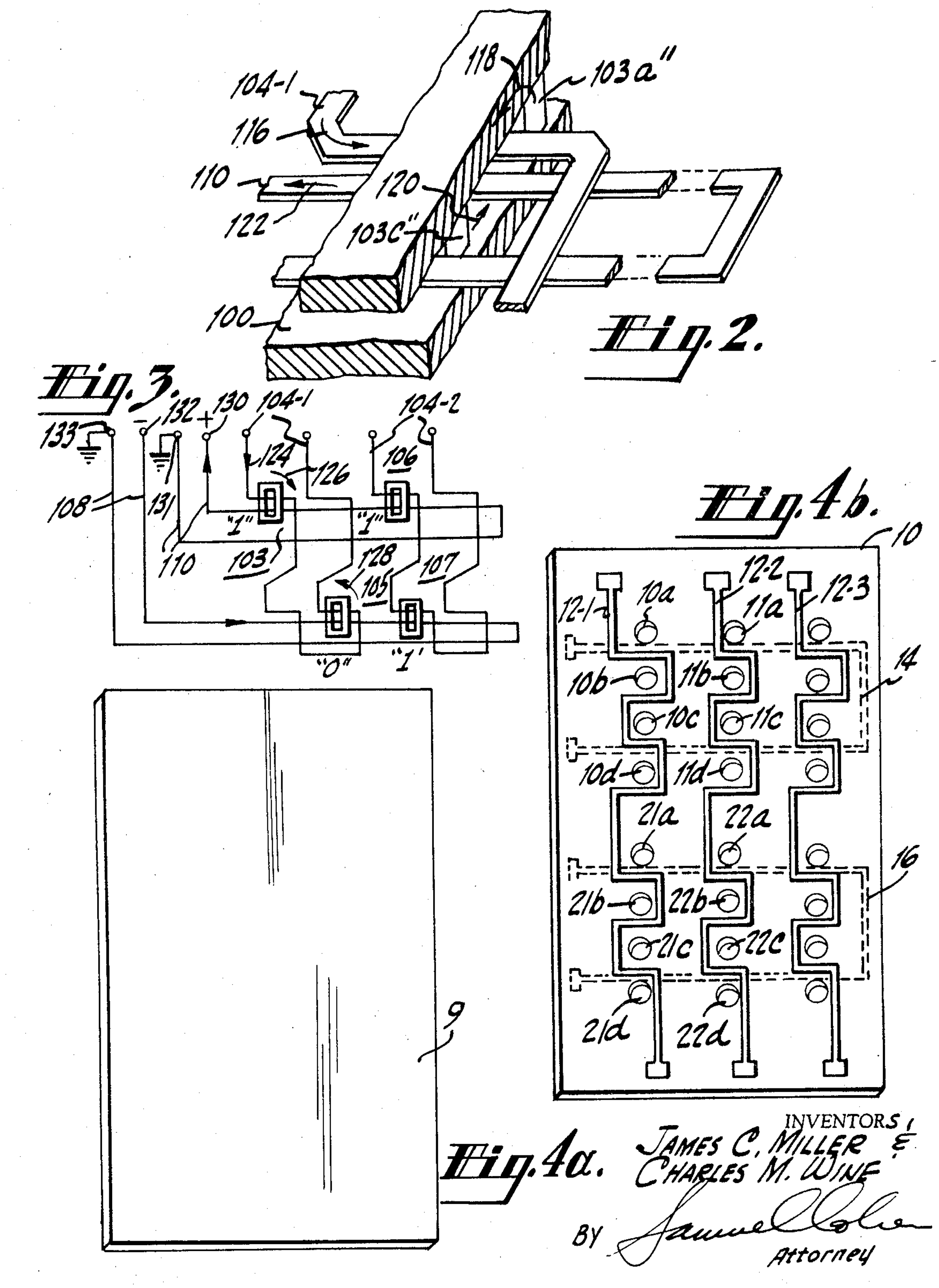
FIGURE 2 is a broken-away, exploded view of one memory location in the memory of FIGURES 1*a*–1*d*.
FIGURE 3 is a schematic drawing of the memory of FIGURES 1*a*–1*d*.
Figure 5:
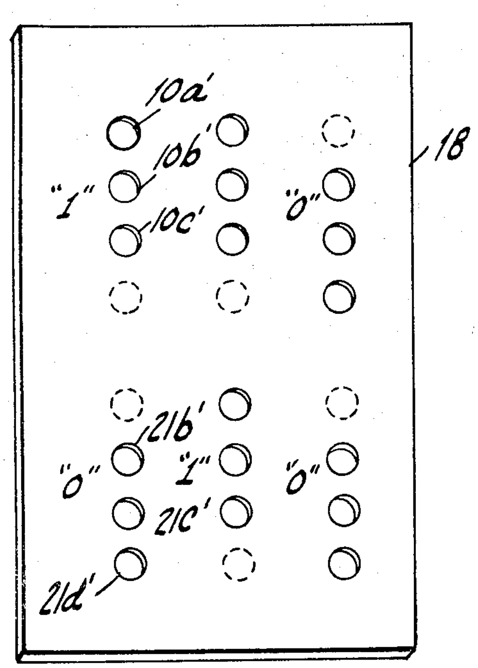
Figure 6:
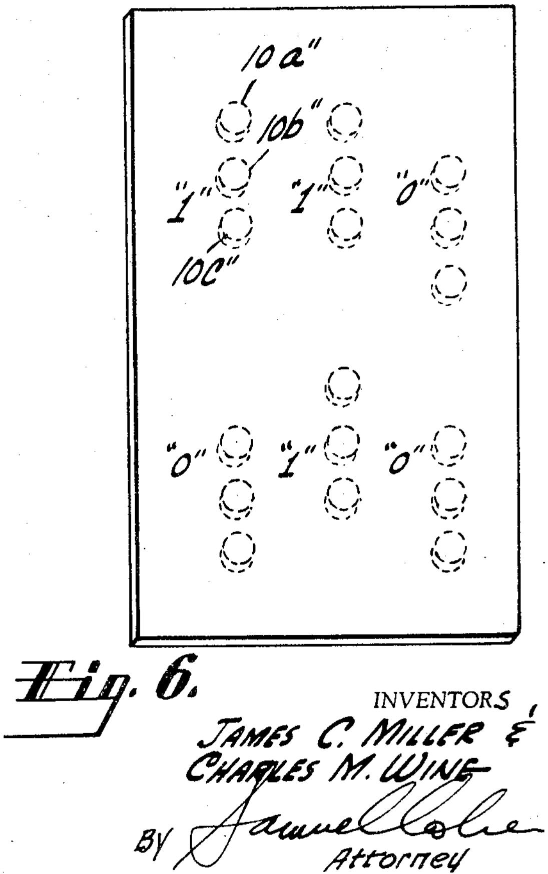
Figures 7, 8, 9:
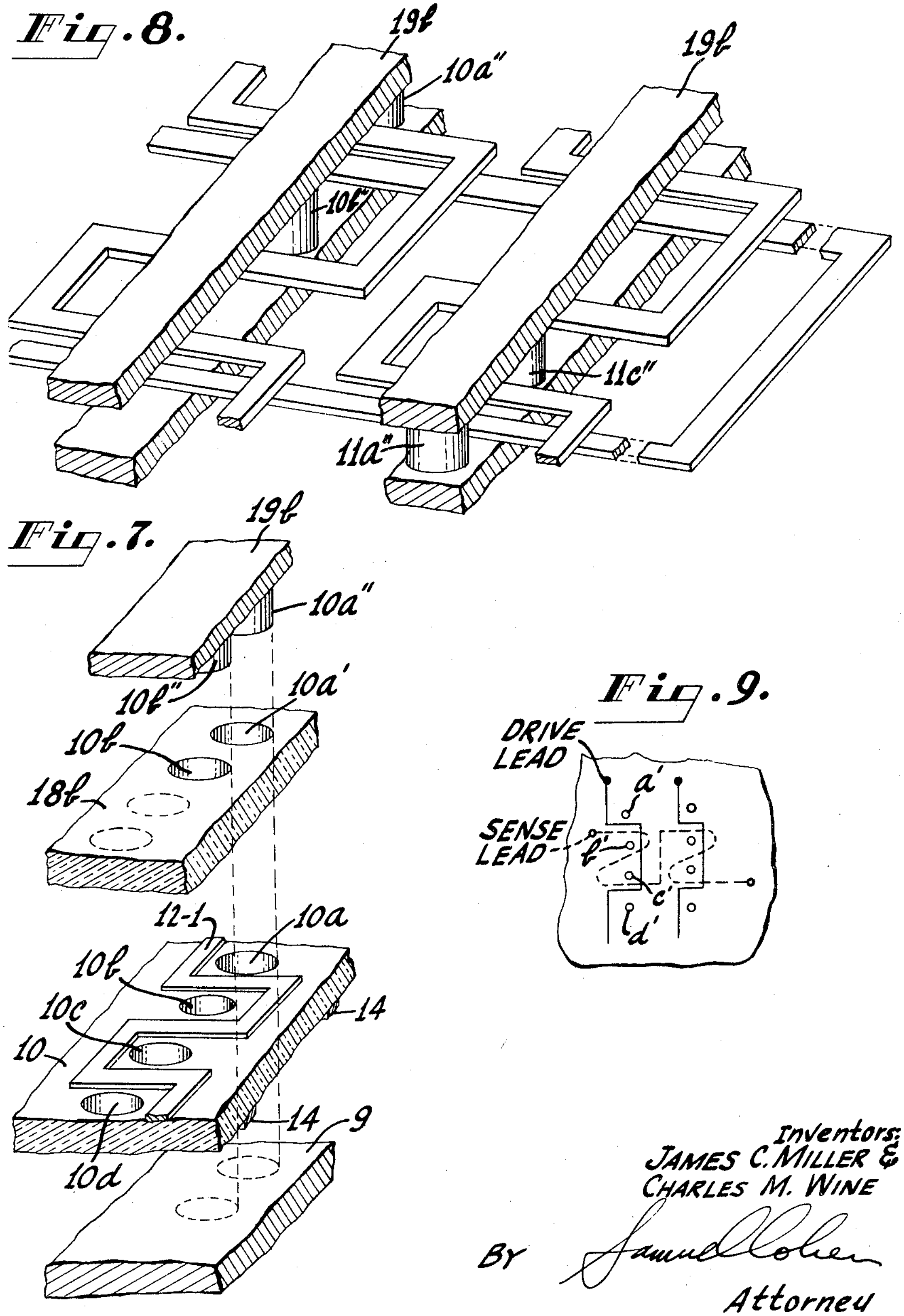
Figure 10:
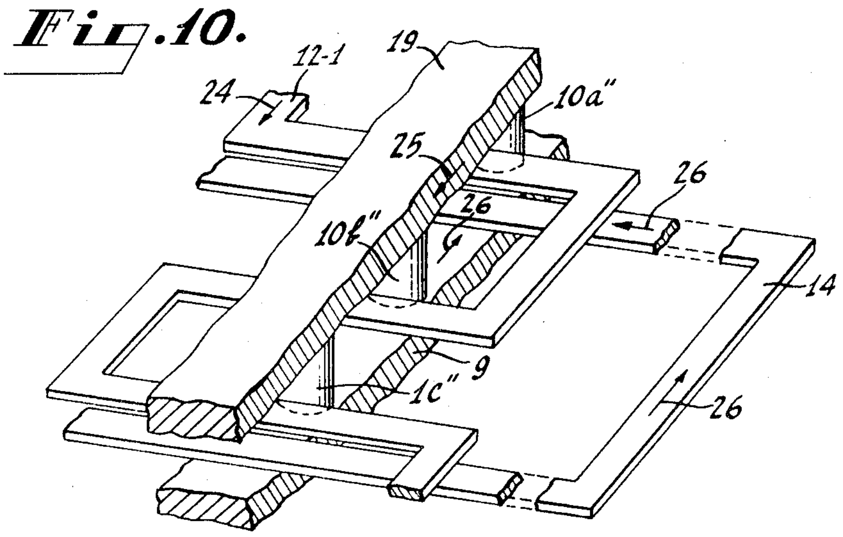
Figure 11:
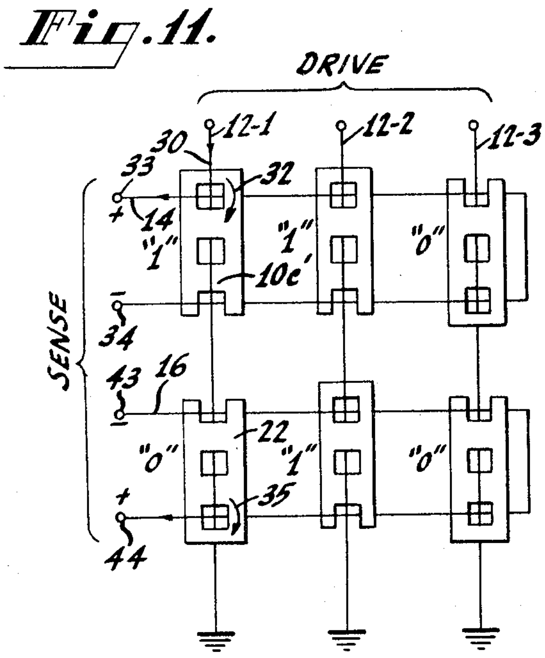
Figure 12:
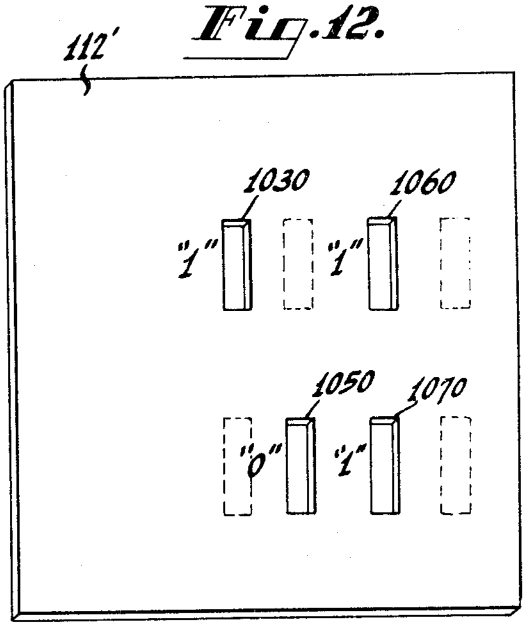

FIGURES 4*a*–4*d* are drawings of the four layers making up a second embodiment of the invention;

FIGURES 5 and 6 together with FIGURES 4*a* and 4*b* are drawings of the four layers making up a third embodiment of the invention;

FIGURE 7 is an exploded view of one memory location in the memory of FIGURES 4*a*–4*d*;

FIGURE 8 is a broken-away view of two memory locations in the memory shown in FIGURES 4*a*–4*d*;

FIGURE 9 is a schematic showing of an alternative winding arrangement;

FIGURE 10 is a broken-away perspective view of a memory location in the embodiment of the invention shown in part in FIGURES 5 and 6;

FIGURE 11 is a schematic drawing of the memory shown in part in FIGURES 5 and 6; and FIGURE 12 together with FIGURES 1*a*, 1*b* and 1*d* are drawings of the four layers making up another embodiment of the invention.

In the description which follows, first the construction of the memory and then its operation is discussed.

FIGURE 1*a* shows the lowermost layer of a memory according to the invention. This layer consists of a sheet 100 of magnetic material as, for example, permalloy, ferrite or similar material.

The second layer of the memory is shown in FIGURE 1*b*. It consists of an insulating substrate 102 such as a Mylar sheet or "card" with a plurality of memory locations therein. For purposes of illustration, the memory is shown to have four memory locations arranged in two rows and two columns. In practice, of course, the memory may have many more locations than this. Each memory location consists of a cluster of four symmetrically arranged holes. The shape of the holes is not critical, however, for purposes of illustration, square holes are shown. One cluster of holes is shown at 103*a*, 103*b*, 103*c* and 103*d*.

There is a drive lead associated with each column of the memory. Two such leads are shown at 104–1 and 104–2, respectively. These leads are formed on the upper surface of the Mylar sheet 102 by any one of a number of well-known techniques, as, for example, photoetching or vapor deposition. Each lead, such as 104–1, passes in one direction between the first pair of holes, such as 103*a* and 103*c*, and in the opposite direction between the second pair of holes, such as 103*b* and 103*d*, of each cluster of four holes.

Each column lead is a word "drive winding." In the example given, the two clusters of holes 103*a*–103*d* and 105*a*–105*d* define a 2-bit word and the two clusters of holes 106*a*-106*d* and 107*a*–107*d* define another 2-bit word.

The sense leads preferably are located on the bottom surface of the insulating sheet 102. Two such sense leads are illustrated in phantom view at 108 and 110, respectively. Preferably, they are not aligned with and in fact are displaced as much as possible from the drive leads, to lessen capacitive coupling between the drive and sense leads. The sense leads pass in the same direction through the *a* and *c*, and *b* and *d* pairs of each cluster of holes. Each sense lead links all of the memory elements in its row. The sense leads may be laid down in the same manner as the drive leads.

The topological arrangement of sense and drive leads shown in FIGURE 1*b* is a preferred arrangement. The paths traced by the leads double back on themselves so that the two connections to each lead are in adjacent positions. This configuration also has the advantage that stray coupling is reduced. And, the pattern for the leads is relatively simple.

After the drive and sense leads are formed on the insulating sheet 102 they are insulated. The insulation may be sprayed on, painted on, or applied by dipping the sheet 102 into an insulating bath. A preferred insulation which may be applied by employing the dipping technique is varnish. An insulation which may be applied by means of a spray is Krylon. Other types of insulation may be employed instead.

The third layer of the memory is shown in FIGURE 1*c*. It consists of a sheet of insulating material 112 which may be a plastic, such as Mylar, or a relatively inexpensive material, such as paper or cardboard. A preferred element is a conventional data processing card through which holes readily may be punched by means of a card punch.

The sheet 112 is formed with clusters of two holes, each such cluster aligned with two of the four holes in a cluster in sheet 102. The position of the two holes indicates the information which is stored. If, as in the case of storage location 103, the first pair of holes 103*a′* and 103*c′* is present, the cluster represents storage of the bit 1. If, as in the case of storage location 105, the second pair of holes 105*b′* and 105*d′* is present, the cluster represents storage of the bit 0. In the example given in FIGURE 1*c*, the memory stores two words, namely 1, 0 and 1, 1 in its first and second columns, respectively.

The fourth layer of the memory is shown in FIGURE 1*d*. It consists of a layer of magnetic material 114 which is applied over the insulating sheet 112 in the form of a slurry. The slurry may have the consistency of heavy cream and, for example, may be a magnetic powder such as 4–79 molybdenum permalloy in a binder consisting of Duco or similar cement or rubber cement. At the present time, rubber cement is preferred because when it dries the layer remains resilient. While the amount of rubber cement needed is not critical, it is found that somewhat less than 5% or so of the total mixture should be cement to form a slurry that has the right consistency. The slurry may be applied by means of a paint brush or a spatula or other means.

When the layer 114 is applied over the card 112 the slurry passes through the aligned sheets of FIGURES 1*b* and 1*c* and makes contact with the magnetic sheet 100 of FIGURE 1*a*. The portions of the slurry which pass through the sheets are in the shape of short posts or rods of square cross section, as indicated in phantom view in FIGURE 1*d*. After a short interval of time, the solvent from the slurry evaporates and the sheet 114 hardens.

A cut-away view of one memory location for the memory of FIGURES 1*a*–1*d* is shown in FIGURE 2. To simplify the drawing, the insulating sheets 102 and 112 are not shown, however, the drive and sense leads are shown. Also, the height of the posts 103*a″* and 103*c″* and various of the thickness dimensions are exaggerated. The parts in FIGURE 2 bear the same reference numerals as analogous parts in FIGURES 1*a*–1*d*. The portions of the slurry which pass through the *a* and *c* holes in this example are legended 103*a″* and 103*c″*.

When a drive current is applied to the drive lead 104–1 in the direction of arrow 116, it causes the "core" 114, 103*a″*, 100, 103*c″* temporarily to become magnetized in the direction indicated by arrows 118, 120. This causes a current to be induced in the sense winding 110 in the direction of arrow 122. This, in turn, causes a voltage of given polarity to develop across the sense winding, this polarity representing storage of the bit 1.

If, on the other hand, there were no holes at the *a′* and *c′* locations in the card 112 but there were holes at the *b′* and *d′* locations of a cluster, then the drive current would cause a sense voltage of opposite polarity to develop. The opposite polarity voltage represents storage of the bit 0.

The magnetic material of which the layer 114 is formed is relatively linear, that is, it does not have a square hysteresis loop and does not retain the magnetization imparted thereto by a drive current. Thus, when the drive current is removed, the cores of the memory become demagnetized.

A schematic drawing of the memory of FIGURES 1*a*–1*d* appears in FIGURE 3. To simplify the showing, each memory element is shown on its side. The memory is arranged in word-organized fashion, that is, all of the bits stored in a column are read out simultaneously.

In the operation of the memory of FIGURE 3, when a drive current in the direction of arrow 124 is applied to drive lead 104–1, the memory element 103 becomes magnetized in the direction of arrow 126 and the memory element 105 becomes magnetized in the direction of arrow 128. The change in flux resulting from the drive current causes sense voltages to develop at the output terminals of the respective sense windings. The sense voltage is relatively positive at terminal 130 of sense winding 103 and relatively negative at the terminal 132 of sense winding 108. To provide a point of reference, the second terminals 131 and 133 of the sense windings 110 and 108, respectively, are shown connected to ground, although such connection is not essential.

In the embodiment of the invention of FIGURES 1*a*–1*d* there are two holes per memory location in card 112. An alternate form of card is shown at 112′ in FIGURE 12. Here, there is only a single elongated hole per memory location. This hole, such as 1030, occupies the same space as the holes 103*a′* and 103*c′* of FIGURE 1*c* and, in addition, also occupies the space between the *a′* and *c′* holes. The remainder of the memory is the same as that shown in FIGURES 1*a*, 1*b* and 1*d*.

When the four layers making up the memory described in the preceding paragraph are assembled, the slurry passes through the card 112′ and through the two holes (*a* and *c* in the case of a stored 1 and *b* and *d* in the case of a stored 0) in the Mylar sheet 102 of FIGURE 1*b*. This slurry therefore makes contact with the column winding, however, since the column winding is insulated, this does not affect the operation of the memory. The memory operates in exactly the same way as the memory of FIGURES 1*a*–1*d*.

In the two embodiments of the invention just discussed, the drive windings are stated to be the column leads and the sense windings the row leads. It is to be appreciated, of course, that these functions may be interchanged, that is, the drive currents applied to leads 108 and 110 and leads 104–1 and 104–2 acting as sense leads.

Another form of memory according to the invention is shown in FIGURES 4*a*–4*d*. The first and fourth layers of the memory shown in FIGURES 4*a* and 4*d*, respectively, are similar to the corresponding layers of the memory of FIGURES 1*a* and 1*d*. The second layer of the memory shown in FIGURE 4*b* consists of an insulating substrate 10 similar to the substrate 102 of FIGURE 1*b*. For purposes of illustration, this memory is shown to have six rather than four memory locations and they are arranged in two rows and three columns. (As in the previous example, the memory may have many more locations than this.) The holes, however, rather than being arranged in a square pattern are arranged in a line, four holes per cluster. One cluster is shown, for example at 10*a*, 10*b*, 10*c*, 10*d*.

As in the previous example, there is a drive lead associated with each colum of the memory. Three such leads are shown at 12–1, 12–2 and 12–3, respectively. They are located on the upper surface of the sheet 10 and the sense leads 14 and 16 are located on the lower surface of the sheet 10. Each lead, such as 12–1, passes in the same direction between the first pair of holes, such as 10*a* and 10*b*, and the last pair of holes, such as 10*c* and 10*d*, of each cluster, and in the opposite direction through the middle pair of holes, such as 10*b* and 10*c*, of each cluster. These leads may, if desired, be returned to the upper edge of the card in the same way as the corresponding leads in FIGURE 1*b*. The sense leads, on the other hand, pass in one direction between the first pair of holes, such as 10*a* and 10*b*, and in the opposite direction between the second pair of holes, such as 10*c* and 10*d*, of each cluster. Each sense lead links all of the memory elements in its row. As in the previous example, the sense and drive leads are insulated to prevent, for example, shorting the sense lead to the magnetic layer 9.

Figures 4C, 4D:
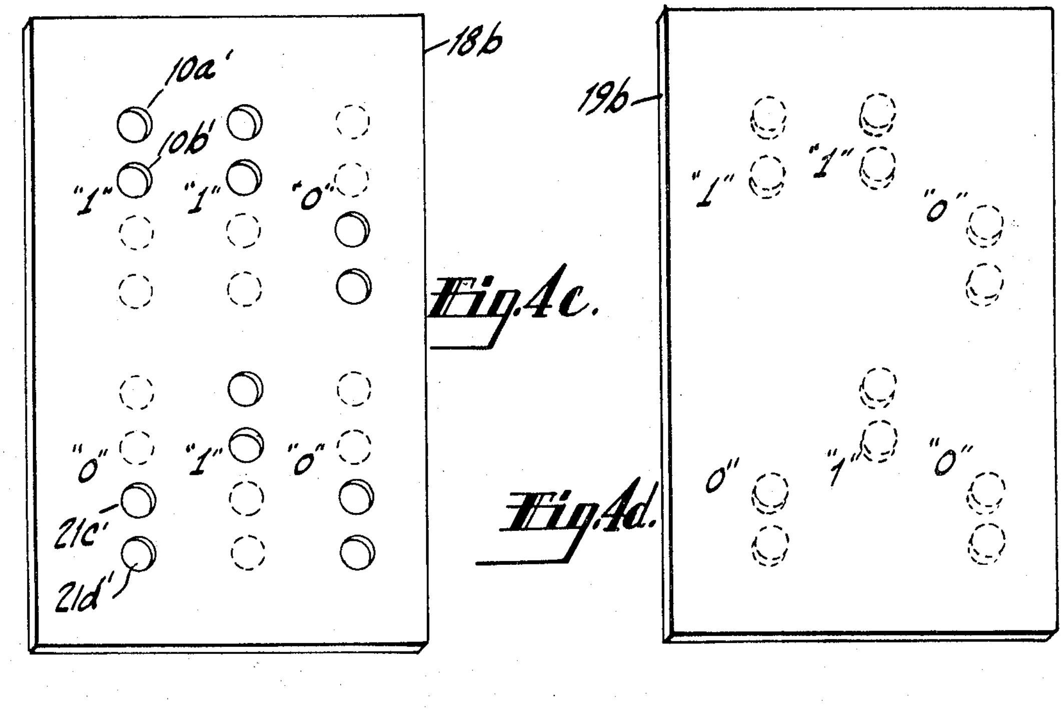

The third layer of the memory **18*b***, shown in FIGURE 4*c*, is formed with clusters of 2 holes, each such cluster aligned with 2 of the 4 holes of the cluster in sheet 10. If the first and second holes *a'* and *b'* are present, the storage location represents storage of the bit 1; if the third and fourth holes *c* and *d* of a cluster are present, the memory location represents storage of the bit 0. In the memory illustrated, column 1 stores the word 1, 0; column 2 stores the word 1, 1; and column 3 stores the word 0, 0.

An exploded view of one memory location of the embodiment of the invention of FIGURES 4*a*–4*d* is shown in FIGURE 7. The parts bear the same reference numerals as the analogous parts in FIGURES 4*a*–4*d*

A perspective, broken-away view of two memory elements of the embodiment of the invention of FIGURES 4*a*–4*d* is shown in FIGURE 8. For the sake of drawing clarity, the insulator sheets **18*b* and 10 are not shown. The leftmost memory element includes only legs 10*a''* and 10*b''* whereas the other memory element includes only legs 11*c''* and 11*d''***. As in the case of the memory of FIGURES 1*a*–1*d*, the layer **19*b*** and the legs which pass through the aligned holes are formed of relatively linear magnetic material so that after the drive current is removed, each memory location becomes demagnetized.

FIGURE 9 is a schematic drawing of an alternate winding configuration for the memory of FIGURES 4*a*–4*d*. The drive leads pass in opposite directions between the *a* and *b*, and *c* and *d* holes whereas the sense lead passes in the same direction through these two pairs of holes. The memory is the same in the sense that in response to a stored 1, the drive current causes a sense signal of one polarity to be produced and in response to a stored 0 the drive current causes a sense signal of the opposite polarity to be produced.

A third form of the invention is illustrated in FIGURES 5 and 6 taken together with FIGURES 4*a* and 4*b*. In this embodiment of the invention, each cluster of holes in the insulator sheet 18 of FIGURE 5 contains three rather than two holes. The *b'* and *c'* holes are always present. If, in addition, an *a'* hole is present, the storage location stores a 1. On the other hand, if the three holes which are present are the *b'*, *c'* and *d'* holes, the memory location stores a 1.

FIGURE 10 is a broken-away view of a single memory location for the embodiment of the invention shown in part in FIGURES 5 and 6. The insulator cards are not shown so that the drive and sense leads may more easily be seen. In response to a drive current in the direction of arrow 24, the core 19, **10*a''*, 9, 10*b''* becomes magnetized in the direction shown by arrows 25, 26, and a sense current is induced in the direction of arrows 26**.

A schematic drawing of the memory shown in part in FIGURES 5 and 6 appears in FIGURE 11. To simplify the showing, each memory element is shown on its side. The memory is arranged in word-organized fashion, that is, all of the bits stored in a column may be read out simultaneously.

In the operation of the memory of FIGURE 6, when a drive current in the direction of arrow 30 is applied to drive lead 12–1, the memory element in column 1, row 1, becomes magnetized in the direction of arrow 32 and a sense voltage develops at terminals 33, 34 which is relatively positive at terminal 33. This same drive current applied to the next memory element 22 results in magnetization thereof in the direction of arrow 35. The resulting sense voltage produced at terminals 43, 44 is relatively positive at terminal 44.

While there are many different ways in which the memory of the invention can be made, a preferred construction method is by means of etching. The sheet of FIGURE 2 is initially copper clad on both sides. Masters are drawn of the desired patterns of holes, drive leads and sense leads. If the memory is relatively small in size, the masters may be reduced by photographic means to form masks. If not, they may be used full size.

The sheet of FIGURE 2 is coated with photoresist and then exposed through the appropriate master to permit removal of the photoresist where the holes are to be. Then the sheet is dipped into ferric chloride which removes the copper where the holes are to be. Next the sheet is dipped into hot sulphuric acid which etches the holes into the Mylar but does not attack the copper. The sheet is then recoated with photoresist, exposed through appropriate masters, and etched with ferric chloride to produce the line pattern on both sides.

As an alternative to the procedure above, the holes may be punched, however, the etching process described is found to give an improved product, that is, one with no burrs or other undesired irregularities.

The manufacture of the other components of the memory is relatively straightforward and need not be discussed in detail.

While a few examples are given of materials which may be used in the present invention, it is to be understood that these are only representative and are not meant to be limiting. Other types of magnetic powders may be employed rather than molybdenum permalloy. Some examples are magnetite, iron oxide, carbonyl iron. Other types of magnetic material may be employed for the magnetic sheet such as 100. The preferred materials have a linear, rather than a square hysteresis loop. Many ferrite or metallic magnetic materials have this property. Other types of insulating substrates may be employed. Some examples are printed circuit boards of various plastic composition, cardboard and so on. In addition, while the thicknesses of the various layers employed in one particular memory were 2 mils for magnetic layer, 5 mils for insulating layers **102*a*, 7 mils for insulating layer 112, and 10 mils for layer 114**, other dimensions are, of course, possible. The design parameters which are employed in any particular memory will depend upon the magnetic properties of the materials such as their permeability, the desired sense signal amplitude, the desired memory cycle time, and so on.

For purposes of the present application, a memory only four layers thick has been shown and described. In practice, each group of four layers makes up a so-called memory card and the cards may be stacked one over another to form a laminated structure which some have termed a "book." In a typical "book" of this kind, there are 12 cards, each with 12 words, each word having 40 bits or, alternatively, each with 12 words and each word having 40 bits. Each card may be 10" long and 5½" wide. The holes in a conventional computing card such as used in one embodiment of the invention are 55 mils x 38 mils and are separated by 30 mils in one direction and 50 mils in the other direction. The clusters are spaced on 174 mil centers in one direction and 250 mil centers in the other direction. Other dimensions are possible and higher bit packing densities are also possible.

What is claimed is:

1. A read-only memory comprising, in combination:

a first layer of magnetic material;

a first sheet of insulator material formed with clusters of holes therein, each said cluster defining a memory location, said sheet of insulator material lying adjacent to the sheet of magnetic material;

drive conductor means located on a surface of said sheet of insulator material and passing among the clusters of holes;

sense conductor means located on a surface of said sheet of insulator material and passing among the clusters of holes;

a second sheet of insulator material having locations corresponding to the memory locations in the first sheet, each location being formed with a given number of holes less than the number in a cluster on the first sheet and at least equal to one, said second sheet lying adjacent to the first sheet of insulator material with the hole or holes at each location in the second sheet aligning either with one or another group of holes, fewer than all, of the cluster of holes at the corresponding location in the first sheet; and a second layer of magnetic material lying adjacent to the second sheet, a portion of said material passing through the aligned holes in the two sheets and making contact with the first layer of magnetic material.

2. A read-only memory as set forth in claim 1, wherein said drive conductor means are formed on one surface of the first sheet of insulator material and said sense conductor means are formed on the opposite surface thereof.

3. A read-only memory as set forth in claim 1, wherein each cluster of holes in the first sheet consists of four holes.

4. A read-only memory as set forth in claim 3, wherein each location in the second sheet is formed with solely one hole.

5. A read-only memory as set forth in claim 3, wherein each location in the second sheet is formed solely with two holes.

6. A read-only memory as set forth in claim 3, wherein each location in the second sheet is formed solely with three holes.

7. A read-only memory as set forth in claim 3, wherein the drive conductor means and the sense conductor means pass between the first pair and the last pair of holes in each cluster in the first sheet.

8. A read-only memory as set forth in claim 7, wherein the drive conductor means pass in the same direction and the sense conductor means in the opposite directions between the first pair and the last pair of holes in each cluster.

9. A read-only memory as set forth in claim 7, wherein the drive conductor means pass in opposite directions and the sense conductor means in the same direction between the first pair and the last pair of holes in each cluster.

10. A read-only memory as set forth in claim 1, wherein the second layer of magnetic material comprises a substantially linear magnetic material.

11. A read-only memory as set forth in claim 10, wherein the second layer of magnetic material comprises particles of magnetic material in a binder.

12. A method of making a memory comprising the steps of:

placing over a sheet of magnetic material a first insulator sheet formed with clusters of holes therein and formed also with drive and sense conductors which pass among the clusters of holes;

forming holes in a second insulating sheet to represent storage of the bits 1 or 0 at locations corresponding to the locations of the clusters of holes in the first sheet, each said location having at least one hole and, in any case, fewer holes than a corresponding cluster in the first sheet but being placed in position to align with one or another group, less than all, of a corresponding cluster of holes in the first sheet;

placing the second insulator sheet over the first insulator sheet with the holes in the second sheet in alignment with holes at corresponding locations in the first sheet; and placing a slurry of magnetic material over the second sheet and in the aligned holes in the two insulator sheets.

13. A read-only memory comprising, in combination:

a first layer of magnetic material;

a first sheet of insulator material formed with clusters of holes therein arranged in columns and rows, each said cluster having four holes and defining a memory location, said sheet of insulator material lying on the sheet of magnetic material;

a plurality of column conductors located on one surface of said sheet of insulator material, each column conductor passing between the first and second, and the third and fourth holes of each cluster in its column;

a plurality of row conductors located on the opposite surface of said sheet of insulator material, each row conductor passing between the first and second, and the third and fourth holes of its row;

a second sheet of insulator material having locations corresponding to memory locations in the first sheet, each location in the second sheet having not more than three holes, said second sheet lying on the first sheet of insulator material with the hole or holes in each cluster of the second sheet aligning either with one or another group, fewer than all, of the holes in the first sheet; and a second layer of magnetic material lying on the second sheet, a portion of said material passing through the aligned holes in the two sheets and making contact with the first layer of magnetic material.

References Cited

UNITED STATES PATENTS

| | | | |
|---|---|---|---|
| 3,308,445 | 3/1967 | Rajchman | 340—174 |
| 3,267,445 | 8/1966 | Ochsner et al. | 340—174 |
| 3,154,840 | 11/1964 | Shahbender | 29—604 |

JAMES W. MOFFITT, Primary Examiner

U.S. Cl. X.R.

29—530, 604, 625, 628